(12) United States Patent
Caspar et al.

(10) Patent No.: US 8,659,803 B2
(45) Date of Patent: Feb. 25, 2014

(54) IMAGE FORMING DEVICE WITH AN ADJUSTABLE SCAN UNIT

(75) Inventors: Christopher Keith Caspar, Shelbyville, KY (US); Brian Dale Cook, Nicholasville, KY (US); Thomas Eugene Pangburn, Winchester, KY (US)

(73) Assignee: Lexmark International, Inc., Lexington, KY (US)

( * ) Notice: Subject to any disclaimer, the term of this patent is extended or adjusted under 35 U.S.C. 154(b) by 428 days.

(21) Appl. No.: 12/824,341

(22) Filed: Jun. 28, 2010

(65) Prior Publication Data
US 2011/0317225 A1 Dec. 29, 2011

(51) Int. Cl.
*H04N 1/04* (2006.01)
(52) U.S. Cl.
USPC ............ 358/474; 358/498; 358/497; 358/496

(58) Field of Classification Search
USPC .................... 358/474, 498, 497, 496
See application file for complete search history.

(56) References Cited

U.S. PATENT DOCUMENTS

| | | | |
|---|---|---|---|
| 6,678,077 B1 * | 1/2004 | Huang ........................ | 358/497 |
| 7,263,312 B2 * | 8/2007 | Park ............................ | 399/124 |
| 7,800,788 B2 * | 9/2010 | Yazawa et al. ................ | 358/474 |
| 2006/0261539 A1 * | 11/2006 | Terada ......................... | 271/162 |
| 2006/0288533 A1 * | 12/2006 | Lee ............................. | 16/330 |

* cited by examiner

*Primary Examiner* — Houshang Safaipour

(57) ABSTRACT

An image forming device including a print unit having a housing and a scan unit disposed on the top surface of the housing. The scan unit is coupled to the housing such that the scan unit is operable to scan an image in an upright position and in a horizontal position. The coupling includes the scan unit slidingly engaging with the print unit along a first edge of the scan unit. A linkage member is pivotably coupled to the scan unit and the print unit for supporting the scan unit in the upright position.

14 Claims, 9 Drawing Sheets

IMAGE FORMING DEVICE WITH AN ADJUSTABLE SCAN UNIT

BACKGROUND

1. Field of the Invention

The present invention relates generally to an image forming device including a print unit and a scan unit and more particularly to the scan unit that is adjustable between vertical and horizontal operable positions.

2. Description of the Related Art

All-In-One (AIO) image forming devices have been known that include a scan unit for scanning an image disposed on a sheet of media and a print unit for printing images thereon. AIO image forming devices provide a single device that performs scanning as well as printing operations.

FIG. 1 illustrates an AIO image forming device 10 according to an existing system. The AIO image forming device 10 includes a scan unit 12 positioned horizontally on a print unit 14. The horizontally positioned scan unit 12 can be used to scan documents such as single sheets of media as well as pages from books or other objects. However, the horizontally positioned scan unit 12 occupies considerable desk space, which is undesirable.

FIG. 2 illustrates a perspective view of a second AIO image forming device 16 according to another existing system. The AIO image forming device 16 includes a scan unit 18 disposed in an upright position over a print unit 20. Though AIO image forming device 16 may occupy less space, however, it is less convenient to scan bound documents, such as pages from a book, using the upright positioned scan unit 18.

SUMMARY OF THE INVENTION

Exemplary embodiments of the present invention overcome shortcomings of prior AIO systems and satisfy a need for an AIO device having improved scan functionality. Disclosed herein is an image forming device including a print unit having a housing that has a top surface and a scan unit disposed on the top surface of the housing and movable between an upright position and a horizontal position. The scan unit includes a scan bed and scans an image from a media sheet placed on the scan bed. The scan unit performs a scan operation with the scan unit being in both the upright position and the horizontal position. In this way, the scan unit may be placed in the upright position when not in use in order to save space or when scanning images disposed on sheets of paper, and placed in the horizontal position when scanning images disposed on bound material.

An exemplary embodiment includes a coupling between the scan unit and the print unit such that an edge of the scan unit slides along the top surface of the print unit. A linkage member supports the scan unit when in the upright position and is pivotally coupled to one of the scan unit and the print unit and engages with the other.

A swinging gate type connector is disposed between the scan lid and the scan bed so that the scan lid may be pivotally opened relative to the scan bed along a first edge when the scan unit is in the upright position, and pivotally opened relative to the scan bed along a second edge opposite the first edge when the scan unit is in the horizontal position. In this way, the scan unit may be conveniently utilized irrespective of position.

Additional features and advantages of the invention will be set forth in the detailed description which follows, and in part will be readily apparent to those skilled in the art from that description or recognized by practicing the invention as described herein, including the detailed description, which follows, the claims, as well as the appended drawings.

It is to be understood that both the foregoing general description and the following detailed description of the present embodiments of the invention are intended to provide an overview or framework for understanding the nature and character of the invention as it is claimed. The accompanying drawings are included to provide a further understanding of the invention and are incorporated into and constitute a part of this specification. The drawings illustrate various embodiments of the invention and together with the description serve to explain the principles and operation of the invention.

BRIEF DESCRIPTION OF THE DRAWINGS

The above-mentioned and other features and advantages of the various embodiments of the invention, and the manner of attaining them, will become more apparent and will be better understood by reference to the accompanying drawings, wherein:

FIG. 3b illustrates an exploded, perspective view of the image forming device of FIG. 3a;

FIGS. 6a-6f illustrate operational views of the working of the image forming device of FIG. 3a.

DETAILED DESCRIPTION

Figure 1:
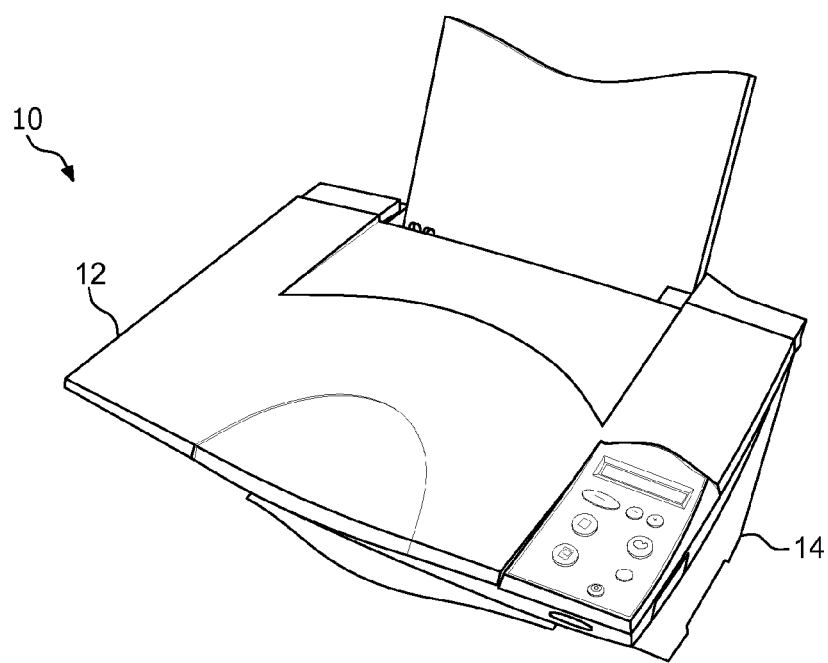
FIG. 1 illustrates a perspective view of an image forming device according to an existing system.
Figure 2:
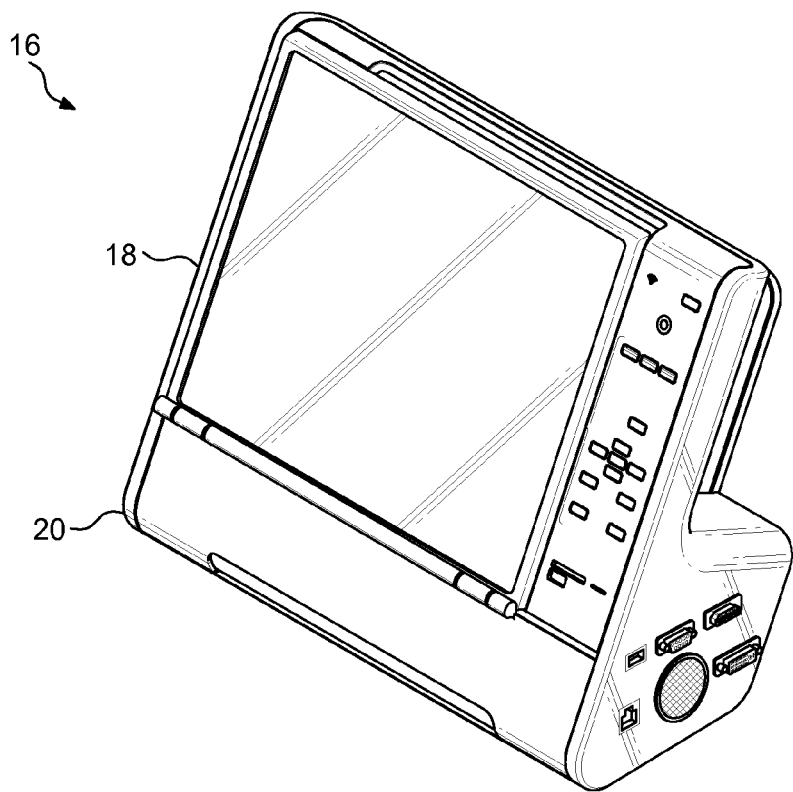
FIG. 2 illustrates a perspective view of a second image forming device according to another existing system.

It is to be understood that the invention is not limited in its application to the details of construction and the arrangements of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof are used broadly and encompass direct and indirect connections, couplings and mountings. In addition, the terms "connected" and "coupled" and variations thereof are not restricted to physical or mechanical connections or couplings.

Reference will now be made in detail to the exemplary embodiment(s) of the invention, as illustrated in the accompanying drawings. Whenever possible, the same reference numerals will be used throughout the drawings to refer to the same or like parts.

Figure 3A:
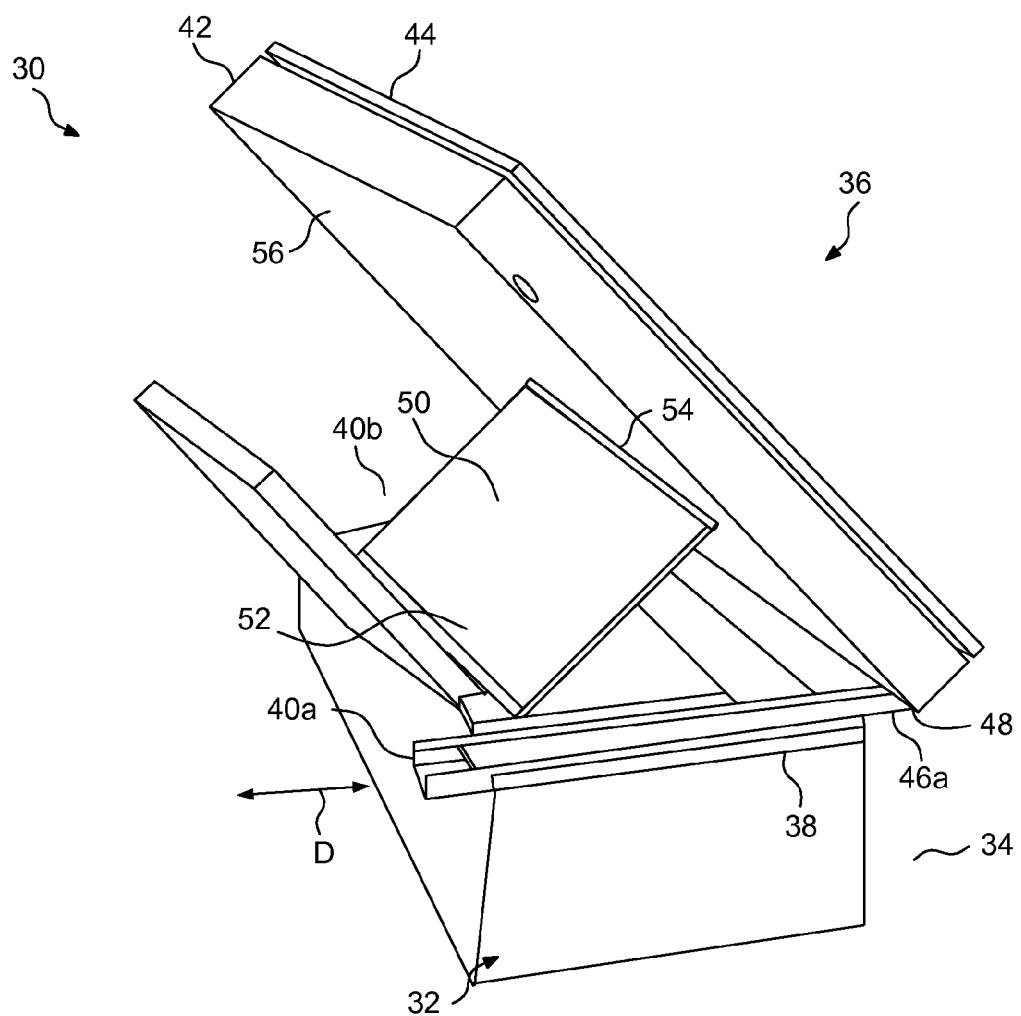
FIG. 3a illustrates a rear perspective view of an image forming device according to an exemplary embodiment of the present invention.
Figure 3B:
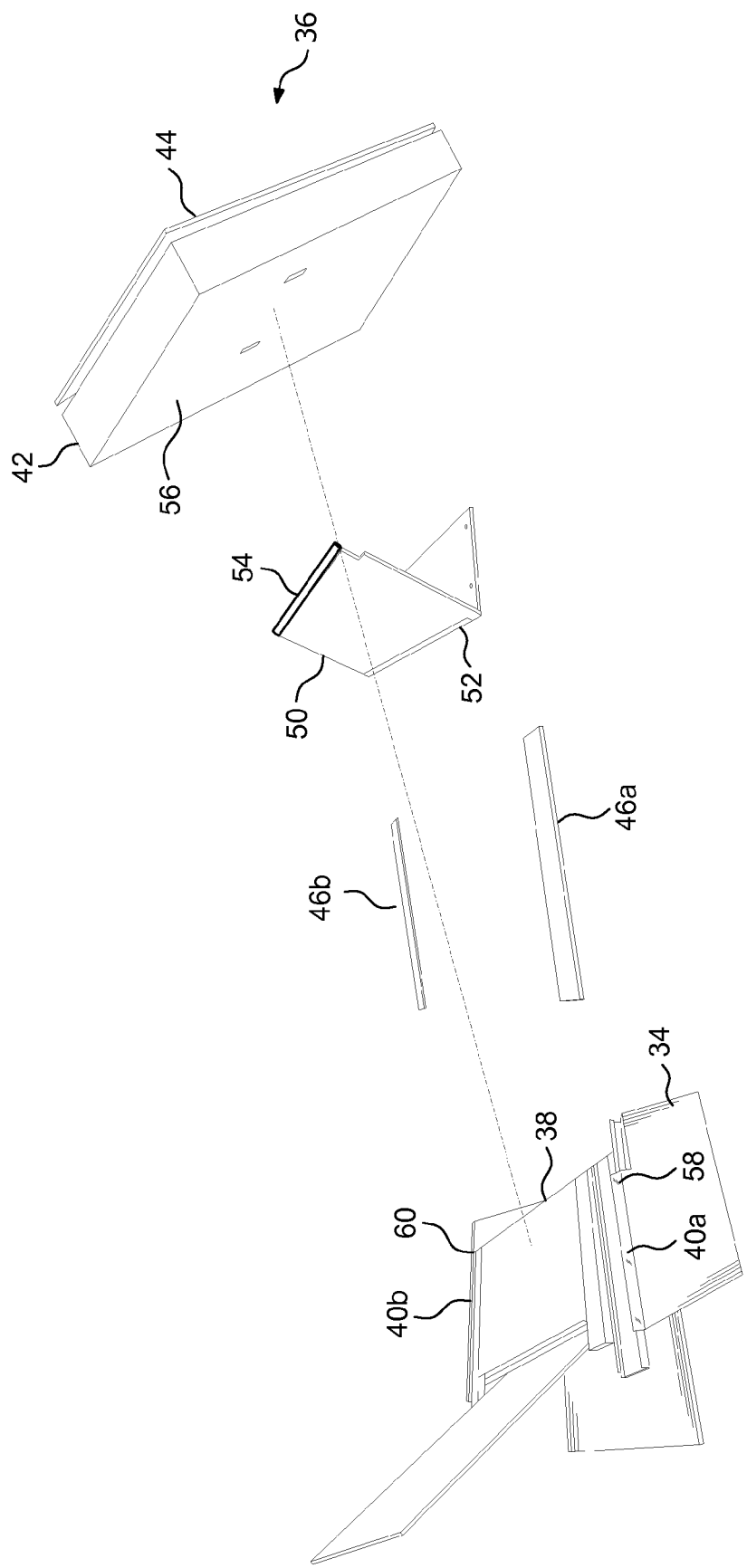

FIGS. 3a and 3b illustrate an image forming device 30 according to an exemplary embodiment of the present invention. The image forming device 30 includes a print unit 32 having a housing 34. A scan unit 36 is disposed on a top surface 38 of the housing 34. A pair of channels 40a and 40b are disposed on or otherwise defined along the top surface 38 of the housing 34, each of which runs from a front portion to a back portion of housing 34.

The scan unit 36 includes a scan bed 42 and a scan lid 44. Scan bed 42 may include components conventionally found in a document scanner, such as a platen of glass or other substantially transparent material and a scanning member (not shown). In one embodiment, the scanning member may be a scan bar assembly for consecutively capturing a portion of an image at a time as the scan bar assembly is moved beneath the platen; a motor for imparting movement to the scan bar assembly during a scan operation to capture the entire image, and a guide rail or the like to which the scan bar assembly is slideably coupled for defining a path of movement of the scan bar assembly during the scan operation, as is known in the art. Alternatively, scan bed 42 may perform a flash scan operation in which an entire image is captured substantially simultaneously, including one or more light sources, an optical path formed in part by one or more lenses, and one or more optical sensors. Components of scan bed 42 may be communicatively coupled to a controller (not shown) for controlling the scan operation.

A document to be scanned is held in between the scan bed 42 and the scan lid 44 during a scan operation. A pair of slide mechanisms 46a and 46b, only one of which is shown in FIG. 3a, are pivotally connected to an edge 48 of the scan unit 36. Each slide mechanism 46a and 46b is disposed within a corresponding one of the pair of channels 40a and 40b such that the pair of slide mechanisms 46a and 46b can slidingly move within the pair of channels 40a and 40b, respectively, in a forward and backward direction, as illustrated by arrow D in FIG. 3a.

The image forming device 30 also includes an elongated linkage member 50 that is pivotably attached to the top surface 38 of the housing 34 and supports scan unit 36 in an upright position. As shown, one end 52 of the linkage member 50 is disposed between the pair of channels 40a and 40b and pivots about a first pivot axis, and other end 54 of the linkage member 50 pivotably engages with a back surface 56 of the scan unit 36 so as to pivot about a second axis. The end 54 of the linkage member 50 rotates relative to the back surface 56 of the scan unit 36 and allows each of the pair of slide mechanisms 46a and 46b to slide within the corresponding pair of channels 40a and 40b, as the scan unit 36 is moved from an upright or vertical position to a horizontal position.

FIG. 3b illustrates an exploded view of the image forming device 30 of FIG. 3a. As shown, the pair of channels 40a and 40b are disposed on opposed sides 58 and 60 of the top surface 38. Each of the pair of slide mechanisms 46a and 46b are disposed within the corresponding pair of channels 40a and 40b.

The linkage member 50 is hinged along ends 52 and 54 to the top surface 38 of the housing 34 between the pair of channels 40a and 40b and to the back surface 56 of scan unit 36, respectively. The linkage member 50 hinged at end 52 is free to rotate about the end 52. The rotation of the linkage member 50 allows each of the pair of slide mechanisms 46a and 46b to move in a backward and forward direction in the corresponding pair of channels 40a and 40b, as shown by arrow D in FIG. 3a.

Figure 4:
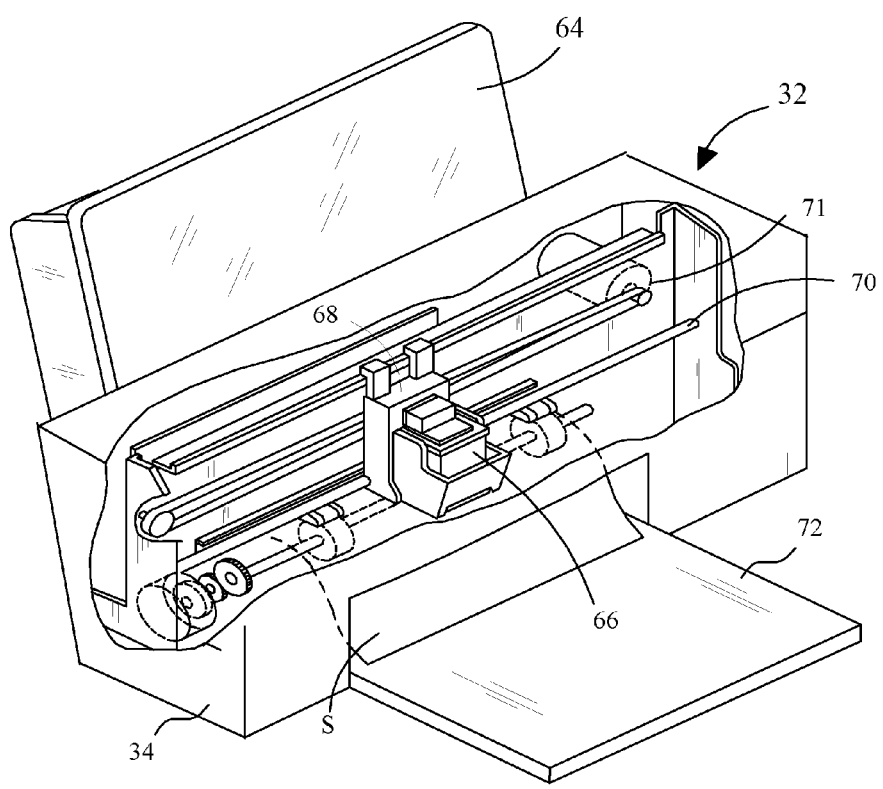
FIG. 4 illustrates a perspective view of the print unit of FIG. 3a according to an exemplary embodiment of the present invention.

FIG. 4 illustrates print unit 32 of FIG. 3a. The print unit 32 may utilize inkjet technology and include a cartridge 66 which serves as a reservoir for ink. Cartridge 66 may be placed in carriage 68, which may be supported on a guide rail 70. A printhead (not shown) may be included along the underside of cartridge 66 or carriage 68 and eject ink maintained in the reservoir of cartridge 66. Cartridge 66 may be slidably moved along guide rail 70 by using a drive mechanism 71. More specifically, the drive mechanism 71 moves cartridge 66 over a media sheet S. More specifically, the printhead of the cartridge 66 moves over the media sheet S in a direction along the guide rail 70 in a back and forth, reciprocating manner. Accordingly, the media sheet S may be printed by the printhead in a bi-directional manner.

Alternatively, print unit 32 may utilize electrophotographic technology for transferring toner particles to a sheet of media or a stationary printhead that extends substantially laterally across the media sheet S for depositing ink thereon.

Print unit 32 may also include a mechanism for moving media sheet S through a print zone defined by cartridge 66 and its movement along guide rail 70. The path media sheet S traverses may be substantially orthogonal to the movement of cartridge 66 along guide rail 70.

The media input tray 64 is positioned to extend from a lower portion of the housing 34 and contains a stack of media sheets. A pick mechanism (now shown) may pick a media sheet from the front of the media stack in the media input tray 64. Once ink is applied to the media sheet, the media sheet is conveyed to output area 72.

Figure 5A:
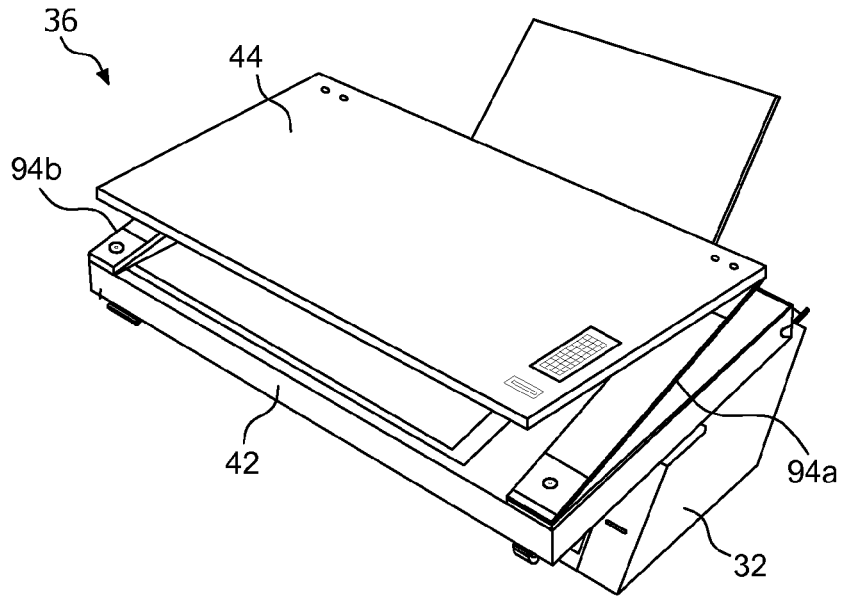
FIG. 5a illustrates a perspective view of the image forming device of FIG. 3a with the scan unit linking mechanism expanded.

FIG. 5a illustrates a perspective view of image forming device 30. The scan unit 36 includes the scan bed 42, the scan lid 44, and a pair of mechanical linkages 94a and 94b coupled between the scan bed 42 and the scan lid 44.

Figure 5B:
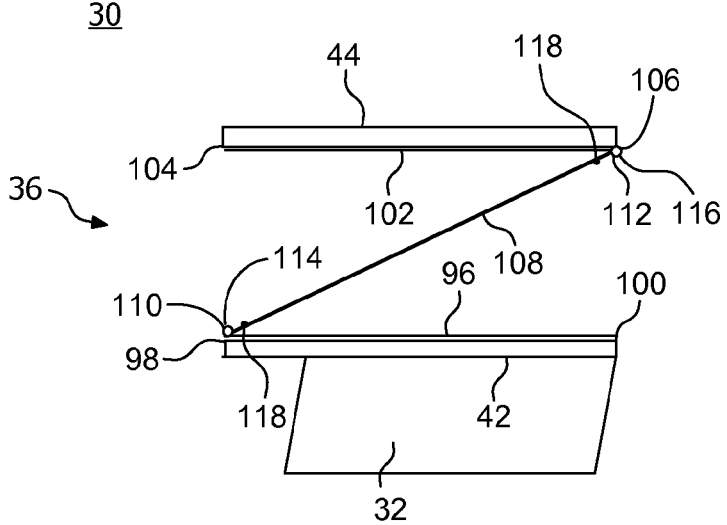
FIG. 5b illustrates a side view thereof.

FIG. 5b is a side view of image forming device 30. Each mechanical linkage 94a and 94b includes a first portion 96 attached along a side of the top surface of scan bed 42, a second portion 102 attached along a corresponding side of scan lid 44, and a connecting element 108 having a first end 110 and a second end 112. The first end 110 of the elongated connecting element 108 is hinged to an end 114 of the first portion 96. The second end 112 of the connecting element 108 is hinged to an end 116 of the second portion 102. The first portion 96 and the second portion 98 may be made from a substantially rigid material, such as a metal. The connecting element 108 may include magnets 118 disposed at the first end 110 and the second end 112 of the elongated connecting element 108 for temporary connection with first portion 96 and second portion 102, respectively, as will be described in greater detail below. Magnets 118 may attach to first and second portions 96 and 102, and may removably detach therefrom by hand-applied pressure.

In another exemplary embodiment, each mechanical linkage member 94a and 94b includes only connecting element 108, the first end 110 of which is hinged along an edge of the top surface of scan bed 42, such as the edge which forms the front edge of scan bed 42 when in the horizontal position and the bottom edge when scan bed 42 is in the upright position. Second end 112 of connecting element 108 is hinged along an edge of scan lid 44, such as the edge thereof which is the back edge when scan bed 42 is in the horizontal position as well as the top edge when in the upright position. The pivoting connections of ends 110 and 112 of connecting element 108 allow for scan lid 44 to be opened relative to scan bed 42 in two different ways, depending upon whether scan unit 36 is in the horizontal position or the upright position. Magnets 118 provide temporary attachment of scan lid 44 to scan bed 42, as discussed in greater detail below.

Figure 6A:
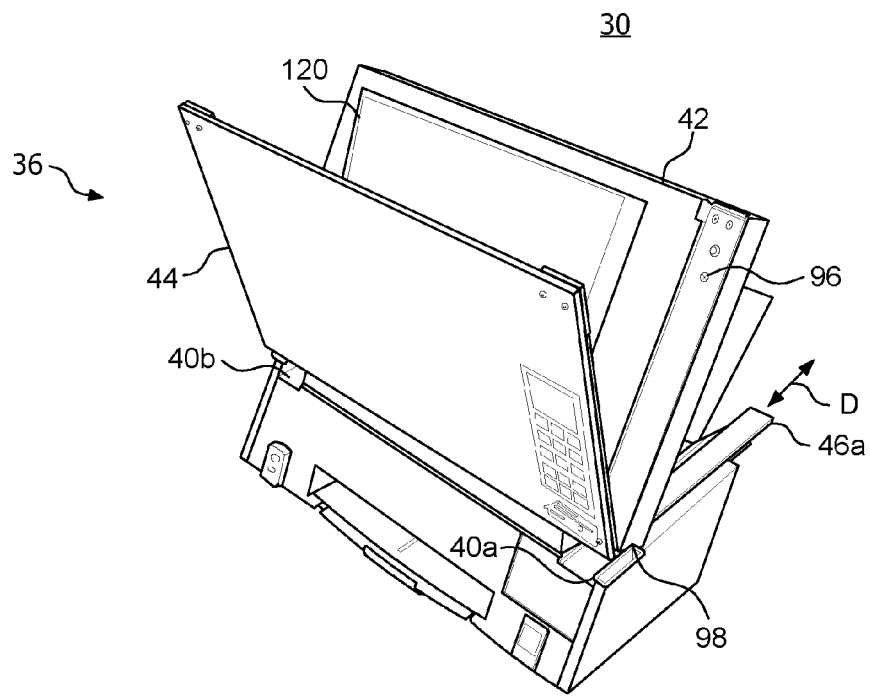

FIGS. 6a-6g illustrate various operable positions of scan unit 42 in accordance with an exemplary embodiment of the present invention. FIG. 6a illustrates a perspective view of the scan unit 36 in an upright, substantially vertical position. As shown, the slide mechanisms 46a and 46b, only one of which is shown in FIG. 6a, extends from a rear portion of the corresponding pair of channels 40a and 40b. With scan unit 36 in the upright position, image forming device 30 occupies less area (i.e., has a lower footprint) than a conventional AIO device, such as AIO device 16.

In the upright position, the second portion 102 of each mechanical linkage 94a and 94b is moved to a first position in which the scan lid 44 is disposed adjacent to the front edge 98 of the scan bed 42. In the first position, magnet 118 disposed on the end 110 of the connecting element 108 is used to temporarily attach the second portion 102 with the connecting element 108 such that the scan bed 42 and the scan lid 44 form a substantially V-shaped scanning structure. Alternatively, in the embodiment in which mechanical linkage 94a and 94b does not include sections 96 and 102, magnet 118 disposed on end 110 of connecting element 108 is used to temporarily attach the bottom edge of scan lid 44 to connecting element 108. A user of the image forming device 30 may position a document 120 to be scanned against the scan bed 42 and may then close the scan lid 44 to scan the document 120.

Figure 6B:
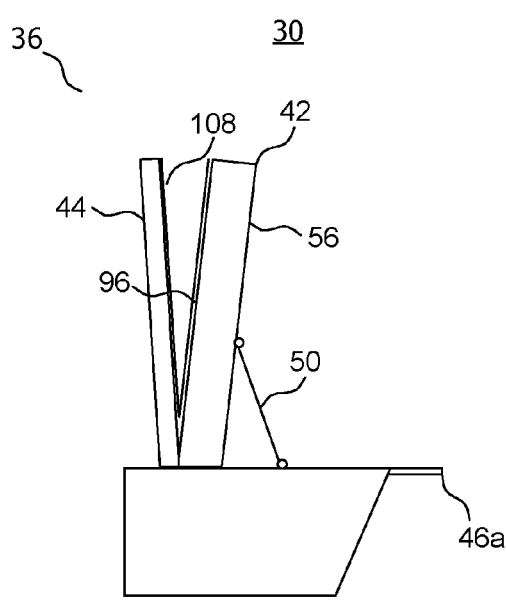

FIG. 6b illustrates a side view of image forming device 30 of FIG. 6a. As shown, the linkage member 50 is rotatably engaged with the back portion of 56 of the scan bed 42 to support scan bed 42 in the substantially vertical position.

Figure 6C:
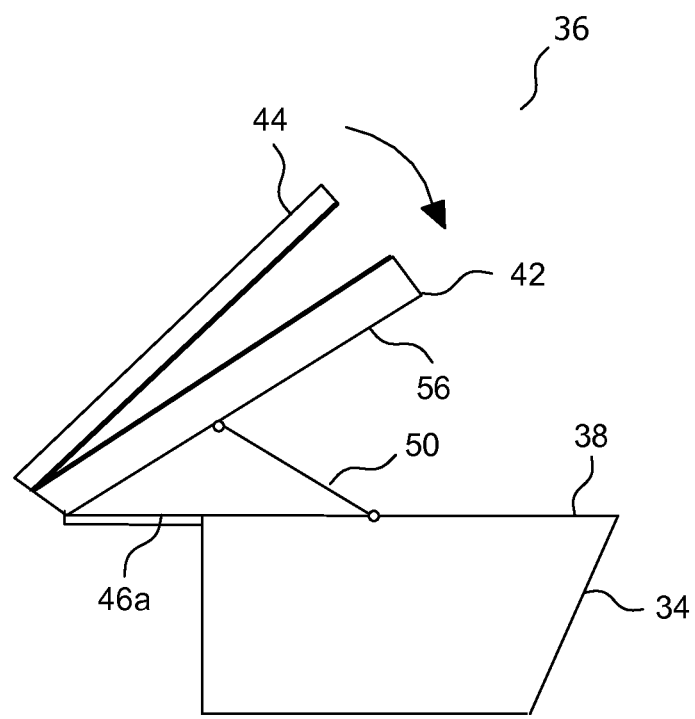
Figure 6D:
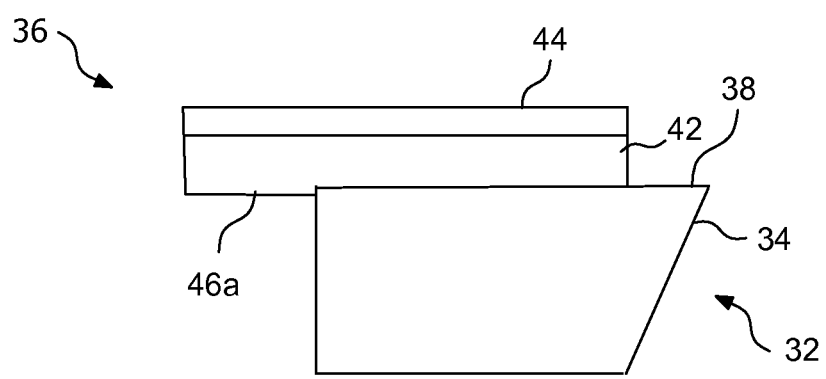

FIGS. 6c-6d depict a side view of image forming device 30 when the scan unit 36 is moved from a substantially vertical position to a substantially horizontal position. As shown, when the scan unit 36 is pivoted from the vertical position to the horizontal position, the front, lower edge of scan unit 36 slides forwardly towards the front of print unit 32. The linkage member 50 pivots about top surface 38 of the housing 34 and bottom surface 56 of scan unit 36, and the pair of slide mechanisms 46a and 46b slide along channels 40a and 40b, respectively, towards the front of image forming device 30. A portion of the scan unit 36 may extend beyond housing 34 at the front of print unit 32 when in the horizontal position. When scan unit 36 is in the horizontal position, linkage member 50 is positioned below the scan unit 36, between the underside of scan unit 36 and the top surface 38 of the housing 34. A portion of each slide mechanism 46a and 46b extends outwardly from the front of print unit 32 and is disposed below the portion of the scan unit 36 extending outwardly from print unit 32.

Figure 6E:
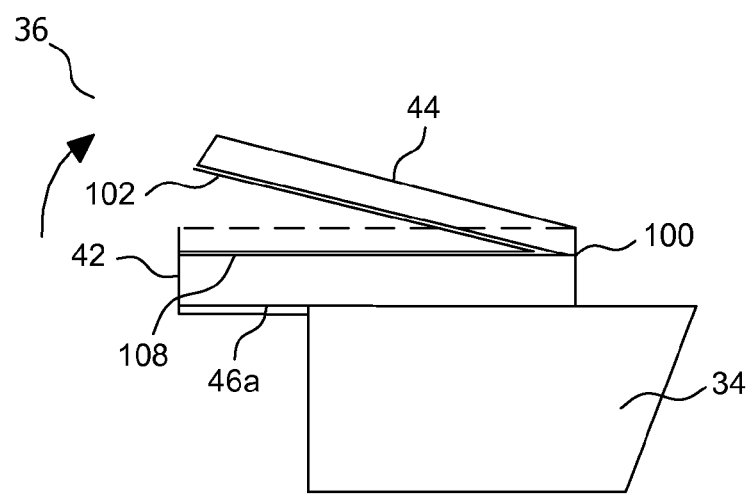
Figure 6F:
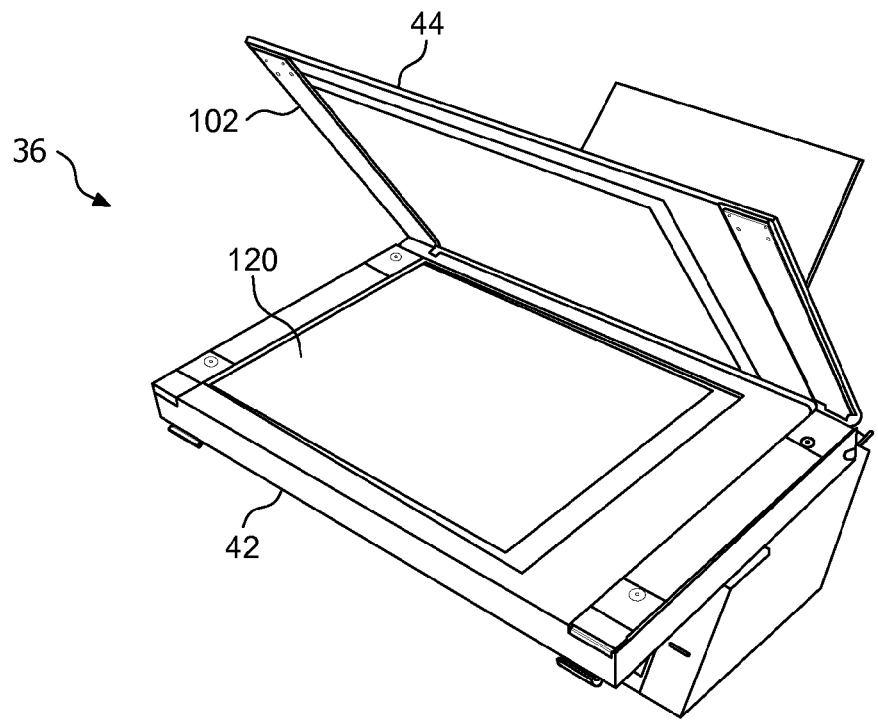

Once scan unit 36 is in the horizontal position, the second portion 102 of each mechanical linkage 94a and 94b can be separated from corresponding connecting element 108 and pivoted along with scan lid 44 relative to scan bed 42 and housing 34 of print unit 32, as shown in FIGS. 6e and 6f. With scan lid 44 in an open position relative to scan bed 42, the magnet 118 disposed on end 112 of connecting element 108 is used to temporarily attach the first portion 96 with connecting element 108 such that the scan bed 42 and the scan lid 44 form a rotated, substantially V-shaped structure (FIG. 6e). With scan bed 42 substantially horizontal, scan lid 44 opens from end 110 of scan bed 42, in contrast to scan lid 44 opening from end 100 thereof when in the substantially vertical position (FIG. 6b). With scan bed 42 in the substantially horizontal position and scan lid 44 opened relative thereto, as shown in FIG. 6f, a media sheet 120 may be placed on scan bed 42 for scanning the contents thereof.

Alternatively, with each linkage mechanism 94a and 94b including connecting element 108 without portions 96 and 102, in the horizontal position scan lid 44 can be separated from connecting elements 108 and pivoted relative to scan bed 42 and housing 34 of print unit 32. With scan lid 44 in an open position, magnet 118 disposed on end 112 of connecting element is used to temporarily attach scan bed 42 with connecting element 108 such that scan bed 42 and scan lid 44 form the rotated, substantially V-shaped structure. Scan lid 44 opens from end 110 of scan bed 42 when scan unit 36 is in the horizontal position.

With scan bed 42 selectively positioned in the upright position, image forming device 30 possesses the ability to use AIO functions, including scanning documents, while occupying a relatively small footprint. In addition, with scan bed 42 in the horizontal position, image forming device 30 has the ability to use its AIO functions, including relatively conveniently scanning bound documents.

Figure 7A:
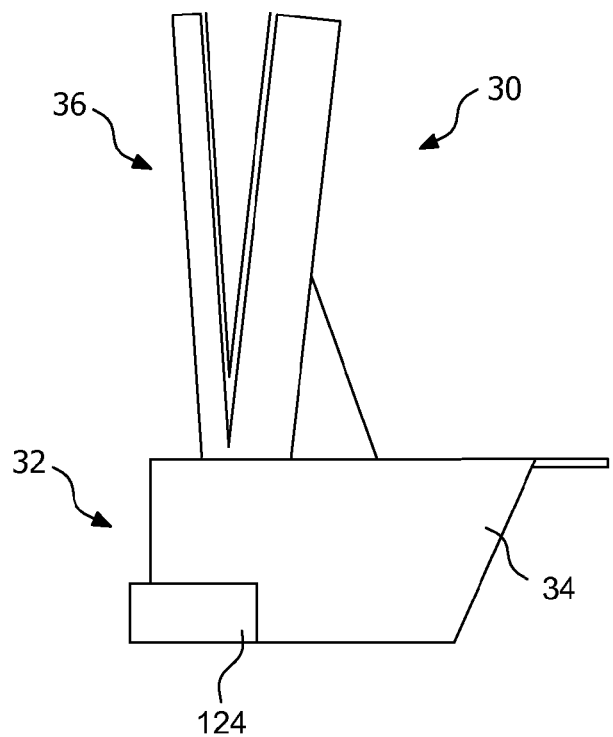
FIGS. 7a-7b illustrate side views of the image forming device according to another exemplary embodiment of the present invention.
Figure 7B:
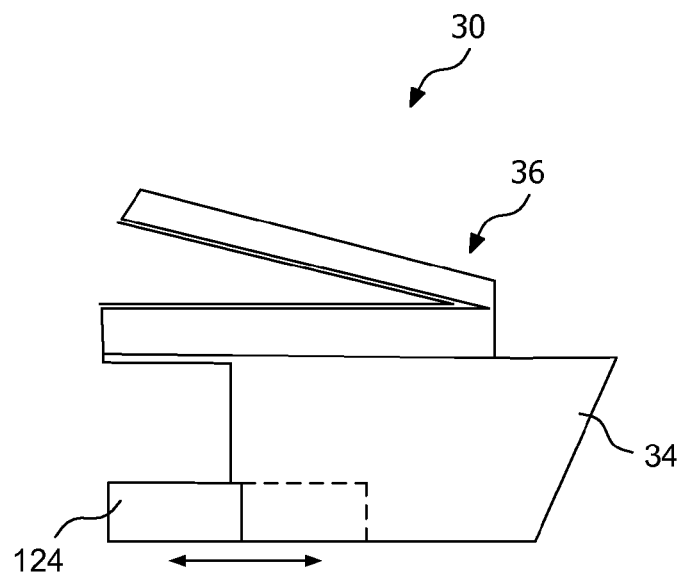

FIGS. 7a-7b illustrate side views of the scan unit 36 according to another embodiment of the present invention. A support member 124 is disposed at and engages with a bottom portion of the print unit 32 and serves to substantially prevent tipping of image forming device 30, particularly when scan bed 42 is in the horizontal position. The support member 124 may be a solid support extending from and in a substantially fixed position relative to housing 34 of print unit 32 (FIG. 7a). Alternatively, support member 124 may slidingly engage with housing 34 of print unit 32 and be pulled therefrom when scan bed 42 is placed in the substantially horizontal position (FIG. 7b). Support member 124 may also form part of output area 72 of print unit 32.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An image forming device comprising:
   a print unit having a housing that has a top surface; and
   a scan unit coupled to the top surface of the housing and movable between a substantially vertical position and a substantially horizontal position, the scan unit operating to scan a sheet of media in each of the substantially vertical position and the substantially horizontal position,
   wherein the scan unit comprises a scan lid, a scan bed and mechanical linkages, each mechanical linkage coupling the scan lid to the scan bed, the mechanical linkages allowing the scan lid to pivot about the scan bed substantially along a first edge thereof and to pivot about the scan bed substantially along a second edge thereof, the second edge of the scan bed being different from the first edge thereof,
   wherein each mechanical linkage comprises a connecting element being elongated and having a first end and a second end, the first end of the connecting element being pivotally connected to the scan bed and the second end of the connecting element being pivotally connected to the scan lid,
   wherein each mechanical linkage further comprises a first magnet disposed in proximity to the first end of the connecting element, and wherein the first magnet serves to temporarily couple together the scan lid and the connecting element,
   wherein each mechanical linkage further comprises a second magnet disposed in proximity to the second end of the connecting element, and wherein the second magnet serves to temporarily couple together the scan bed and the connecting element, and wherein the first magnet serves to temporarily couple together the scan lid and the connecting element when the scan lid is pivoted about the first edge of the scan bed, and the second magnet serves to temporarily couple together the scan bed and the connecting element when the scan lid is pivoted about the second edge of the scan bed.

2. The image forming device of claim 1, wherein the print unit housing includes at least one channel defined along the top surface thereof and the scan unit includes at least one slide mechanism disposed within the at least one channel of the print unit to allow movement of the scan unit between the substantially vertical position and the substantially horizontal position, relative to the print unit.

3. The image forming device according to claim 2, further comprising a linkage member pivotably attached to the top surface of the print unit and a back surface of the scan unit for supporting the scan unit when in the substantially vertical position.

4. The image forming device of claim 1, wherein the scan unit extends outwardly from a front portion of the print unit when in the substantially horizontal position.

5. An image forming device comprising:
a print unit having a housing, the housing having a top surface;
a scan unit coupled to the top surface of the housing and having a scan bed and a scan lid, the scan lid being connected to the scan bed, the scan unit being movable between an upright position and a horizontal position relative to the print unit,
wherein the scan unit further includes a connector mechanism coupled between the scan lid and the scan bed such that the scan lid is pivoted about the scan bed along a first edge of the scan bed and pivoted about the scan bed along a second edge of the scan bed, the first edge of the scan bed being different from the second edge thereof, wherein the scan unit further includes a pair of slide members pivotably coupled to and extended from the scan unit, the slide members slidingly engage with the top surface of the housing, and wherein the top surface of the housing further includes a pair of channels disposed on opposed sides of the top surface, each of the slide members being disposed within a corresponding one of the pair of channels to allow movement of the scan unit between the upright position and the horizontal position.

6. The image forming device according to claim 5, further comprising a linkage member rotatably attached to each of the print unit and the scan unit for supporting the scan unit when in the upright position.

7. The image forming device according to claim 5, wherein the scan unit extends outwardly from a front portion of the print unit when in the horizontal position.

8. The image forming device according to claim 5, wherein the connector mechanism comprises a pair of connecting members, each connecting member being elongated and having a first end and an opposed second end, the connecting member pivotally coupling at the first end to the scan bed and pivotally coupling at the second end to the scan lid.

9. The image forming device according to claim 8, wherein each connecting member includes a first magnet disposed in proximity with the first end of the connecting member and a second magnet disposed in proximity with the second end thereof, the first magnet providing temporary coupling between the connecting member and the scan lid and the second magnet providing temporary coupling between the connecting member and the scan bed.

10. The image forming device according to claim 1, wherein the first edge of the scan bed is opposed the second edge of the scan bed.

11. An image forming device comprising:
a print unit having a housing that has a top surface; and
a scan unit coupled to the top surface of the housing and movable between a substantially vertical position and a substantially horizontal position, the scan unit operating to scan a sheet of media in each of the substantially vertical position and the substantially horizontal position,
wherein the print unit housing includes at least one channel defined along the top surface thereof and the scan unit includes at least one slide mechanism disposed within the at least one channel of the print unit housing and pivotably coupled to the scan unit to allow movement of the scan unit between the substantially vertical position and the substantially horizontal position, relative to the print unit.

12. The image forming device according to claim 11, further comprising a linkage member pivotably attached to the top surface of the print unit housing and a back surface of the scan unit for supporting the scan unit when in the substantially vertical position.

13. An image forming device comprising:
a print unit having a housing, the housing having a top surface; and
a scan unit coupled to the top surface of the housing and having a scan bed and a scan lid, the scan lid being connected to the scan bed, the scan unit being movable between an upright position and a horizontal position relative to the print unit,
wherein the scan unit further includes a pair of slide members pivotably coupled to the scan unit, and wherein the slide members slidingly engage with the top surface of the print unit housing.

14. The image forming device according to claim 13, wherein the top surface of the housing further includes a pair of channels disposed on opposed sides of the top surface, each of the slide members being disposed within a corresponding one of the pair of channels to allow movement of the scan unit between the upright position and the horizontal position.

* * * * *